United States Patent [19]

McKissick et al.

[11] Patent Number: 4,859,695

[45] Date of Patent: Aug. 22, 1989

[54] ANTIESTROGEN AGENTS HAVING ANABOLIC ACTIVITY IN ANIMALS

[75] Inventors: Gaylord E. McKissick, Bridgewater; Roger M. Weppelman, Scotch Plains, both of N.J.

[73] Assignee: Merck & Co., Inc., Rahway, N.J.

[21] Appl. No.: 872,738

[22] Filed: Jun. 10, 1986

[51] Int. Cl.$^4$ .............................................. A23K 1/165
[52] U.S. Cl. ..................................... 514/408; 548/400
[58] Field of Search ....................... 514/400, 177, 461; 548/400

[56] References Cited

U.S. PATENT DOCUMENTS 2,945,765  7/1960  Snyder et al. ........................ 514/177

OTHER PUBLICATIONS

Chemical Abstracts, vol. 72, 18801h, (1970).
USAN and USP Dictionary of Drug Names–Jun. 15, 1961–Jun. 15, 1984.

*Primary Examiner*—Nicholas S. Rizzo
*Attorney, Agent, or Firm*—David L. Rose; Michael C. Sudol

[57] ABSTRACT

Novel antiestrogen compositions are disclosed as having anabolic activities. The compositions disclosed herein are useful for enhancing growth and feed conversion animals, particularly to poultry, usually in admixture with animal sustenance. Also, disclosed herein are methods of administering said compositions to animals.

1 Claim, No Drawings

ANTIESTROGEN AGENTS HAVING ANABOLIC ACTIVITY IN ANIMALS

BACKGROUND OF THE INVENTION

This invention is related to novel anabolic compositions and methods of administering the same to animals. The invention further relates to the use of said compositions for enhancing growth and feed conversion in animals. This invention more particularly relates to novel compositions comprising an antiestrogen in combination with veterinary feed for use in the enhancing growth and feed conversion in animals.

Various androgens and estrogens have been used as anabolic agents in the past, notably in cattle and poultry. Androgens are potent teratogens which adversely affect the sexual differentiation of females and estrogens induce uterine cancer. Antiestrogens do not have these liabilities.

SUMMARY OF THE INVENTION

This invention describes certain novel anabolic compositions comprising an antiestrogen in Combination with animal feed useful in enhancing growth and feed conversion in animals. Administration of a small amount of an antiestrogen disclosed herein, preferably by combination with animal feed is effective in enhancing growth and feed conversion in animals.

Accordingly, it is an object of this invention to provide novel compositions comprising an antiestrogen useful as an anabolic agent and animal feed.

Still another object of the invention is to provide novel feed compositions which contain a dietary dosage amount of an antiestrogen agent which is useful in enhancing growth and feed conversion in animals.

A further object of the invention is to provide a new and useful method for enhancing growth in animals, which comprises administering a small amount of the antiestrogen agents of this invention.

These and further objects of this invention will become apparent from the following description.

DESCRIPTION OF THE INVENTION

The novel compositions of this invention comprise an antiestrogen agent and animal feed being useful as an anabolic agent. It has been found that antiestrogens such as Tamoxifen (1-p-$\beta$-dimethylaminoethoxyphenyl-trans-1,2-diphenylbut-1-e improve growth and feed efficiency.

The antiestrogen agents employed in the practice of the invention are known and processes for preparation are also known to the art and are hereby incorporated herein by reference. As an example, the antiestrogen agents employed herein are disclosed in USAN and USP Dictionary of Drug Names—June 15, 1961 through June 15, 1984. Representative antiestrogen agents are: Clometherone-6$\alpha$-Chloro-16$\alpha$-methylpregn-4-ene-3,20-dione; Nafoxidine Hydrochloride-1-[2-[p-(3,4-Dihydro-6-methoxy-2-phenyl-1-naphthyl)phenoxy]ethyl]pyrrolidine hydrochloride; Nitromefene citrate-1-[2-[p-[$\alpha$-(p-methoxyphenyl)-$\beta$-nitrostyryl]phenoxy]ethyl]pyrrolidine citrate; Trioxefene mesylate-3,4-dihydro-2-(p-methoxyphenyl)-1-naphthyl p-[2-(1-pyrrolidinyl]-phenyl ketone methanesulfonate; and Exthamorytriphetol-1-[p-(2-diethyl-aminoethoxy)phenyl]-2-(p-methoxyphenyl)-1-phenylethanol.

The novel compositions of this invention are orally administered to animals, especially poultry for enhancing growth and feed conversion in animals. Any number of conventional methods are suitable for administering the anabolic compositions of this invention to animals, especially poultry, as for example, they may be given in feed or water forms The actual quantity of the antiestrogen agent administered to the animals in accordance with this invention will vary over a wide range and can be adjusted to individual needs.

Of the various methods of administering the compositions of this invention, they are most conveniently administered as a component of a feed composition. The novel anabolic compositions may be readily dispersed by mechanically mixing the same in finely ground form with the feedstuff, or with an intermediate formulation (premix) that is subsequently blended with other components to prepare the final feedstuff that is fed to the animal. Typical components of the feedstuffs include molasses, fermentation residues, corn meal, ground and rolled oats, wheat shorts and middlings, alfalfa, clover and meat scraps, together with mineral supplements such as bone meal and calcium carbonate and vitamins.

A typical feed composition may contain from about 1 ppm to 100 ppm antiestrogen, preferably from about 5 to 60 ppm antiestrogen and most preferably 10 ppm to 15 ppm antiestrogen and conventional feed. Typical amounts [mg/kg] can be used for solid feed or liquid administration. The optimum levels will naturally vary with the specific antiestrogen compound and can be readily determined by one skilled in the art.

Some studies which further exemplify the invention concept of the invention are listed below.

A

Twenty pens, each containing seven to ten five-week-old male broiler chickens, comprised the experiment. At the start of treatment, individual birds were weighed and their diets were changed to basal broiler ration containing the concentrations of Tamoxifen shown in Table 1 below. Four pens received each of the five concentrations. One week later, individual birds were again weighed and the amount of feed consumed by each pen was determined.

Table 1 shows that all doses of Tamoxifen, except 50 ppm, improved weight gain during the one week treatment period. These data also show that all doses including 50 ppm improved the conversion of feed into weight gain.

TABLE 1

| | Effects of Tamoxifen on Gain and Conversion | |
|---|---|---|
| Tamoxifen in Diet (ppm) | Weight Gain ± S.D. (kg)[1] | Conversion ± S.D.[2] |
| 0 | .46 ± .08 | 2.23 ± .26 |
| 50 | .45 ± .07 | 2.15 ± .28 |
| 25 | .50 ± .06 | 2.03 ± .17 |
| 12.5 | .49 ± .11 | 2.02 ± .20 |
| 6.25 | .48 ± .11 | 2.08 ± .17 |

1. Each number is the average of the individual gains of 37–39 chickens.

2. Conversion was calculated for each pen as the ratio of feed consumed in a pen divided by the total weight gained by the chickens occupying that pen. Each number presented is the average of the conversion ratios of four pens.

B

Twenty pens, each containing 48–50 five-week-old male broiler chickens, comprised the experiment. At the start of treatment, individual birds were weighed and their diets were changed to basal broiler ration containing the concentrations of Tamoxifen shown in Table 2 below. Five pens received each of the four concentrations. Two weeks later, individual birds were again weighed and the food consumed by each pen was determined.

Table 2 shows that all doses of Tamoxifen tested improved weight gain. In all cases, the improvements were statistically significant. Table 2 also shows that all doses of Tamoxifen improved the conversion of feed into weight gain. The most effective dose, 12.5 ppm improved overall weight gain more than 7% and conversion by about 5%.

TABLE 2

| Tamoxifen in Diet (ppm) | Effects of Tamoxifen on Gain and Conversion | |
| --- | --- | --- |
| | Weight Gain ± S.D. (G)[1] | Conversion ± S.D.[2] |
| 0 | 840 ± 124 | 2.38 ± .05 |
| 6.25 | 887 ± 128* | 2.32 ± .04 |
| 12.5 | 904 ± 123* | 2.27 ± .03* |
| 25.0 | 880 ± 119* | 2.35 ± .09 |

*Significantly different from control (Dunnett's $p < .05$).

1 Each number is the average of the individual gains of 237–245 chickens.

2 Conversion was calculated for each pen as the ratio of feed consumed in a pen divided by the total weight gained by the chickens occupying that pen. Each number is the average of the conversion ratios of five pens.

What is claimed is:

1. A method of enhancing growth and feed conversion in animals which comprises administering from 1 to 100 ppm in the animal's feed of an antiestrogen agent selected from nafoxidine hydrochloride (1-[2-[P-(3,4-dihydro-6-methoxy-2-phenyl-1-naphthyl)phenoxy]ethyl]pyrrolidine hydrochloride); nitromefene citrate 1-[2-[P-[α-P-methoxyphenyl)-β-nitrostyryl]phenoxy]ethyl]pyrrolidine citrate); trioxefene mesylate (3,4-dihydro-2-(p-methoxyphenyl)-1-naphthyl p-[2-(1-pyrrolidinyl]phenyl ketone methanesulfonate).

* * * * *